United States Patent [19]

Brown

[11] Patent Number: 5,533,575
[45] Date of Patent: Jul. 9, 1996

[54] ELASTOMERIC SHOE FOR ATTACHMENT TO AN EQUIDAE HOOF

[76] Inventor: David W. Brown, 9801 Spring Rd., Eden Prairie, Minn. 55347

[21] Appl. No.: 314,609

[22] Filed: Sep. 28, 1994

[51] Int. Cl.⁶ .................. A01L 5/00; A01L 1/00
[52] U.S. Cl. .................. 168/4; 168/28
[58] Field of Search .................. 168/4, 12, 14, 168/28

[56] References Cited

U.S. PATENT DOCUMENTS

| | | | |
|---|---|---|---|
| 717,614 | 1/1903 | Peacock | 168/4 |
| 866,127 | 9/1907 | Glassbrooke | 168/28 |
| 903,043 | 11/1908 | Barber | 168/28 |
| 1,273,731 | 7/1918 | Button | 168/28 |
| 1,344,504 | 6/1920 | Grosjean . | |
| 1,702,882 | 2/1929 | Tweed . | |
| 1,855,843 | 4/1932 | Savidge | 168/28 |
| 3,628,608 | 12/1971 | Sherman | 168/4 |
| 4,286,666 | 9/1981 | Nakanishi | 168/4 |
| 5,121,798 | 6/1992 | Lindh | 168/12 |
| 5,213,163 | 5/1993 | Schaffer | 168/4 |
| 5,303,777 | 4/1994 | Zook | 168/12 |
| 5,330,008 | 7/1994 | Sigafoos et al. | 168/12 |
| 5,421,415 | 6/1995 | Wells | 168/4 |

FOREIGN PATENT DOCUMENTS

| | | |
|---|---|---|
| 893528 | 2/1972 | Canada . |
| 1239202 | 7/1971 | United Kingdom . |
| 1249106 | 10/1971 | United Kingdom . |
| 1512983 | 6/1978 | United Kingdom . |

Primary Examiner—Robert P. Swiatek
Attorney, Agent, or Firm—Merchant, Gould, Smith, Edell, Welter & Schmidt

[57] ABSTRACT

A shoe of elastomeric material for attachment to a hoof of an equidae, such as a horse. The shoe has a peripheral configuration corresponding to the peripheral configuration of the sole of an equidae hoof and a cross section of substantially uniform thickness. The shoe includes a tread and a ply, which has sufficient thickness and strength to hold any nails used to attach the shoe to a hoof.

20 Claims, 3 Drawing Sheets

ELASTOMERIC SHOE FOR ATTACHMENT TO AN EQUIDAE HOOF

FIELD OF THE INVENTION

The present invention relates to hoof protection and, in particular, to a shoe, which is fabricated from an elastomeric material containing ply capable of holding nails therein, for attachment to a hoof of an equidae.

BACKGROUND OF THE INVENTION

Members of the equidae family (referred to herein as equidae), in particular domestic horses, are routinely shod with flat and relatively inflexible shoes of metal, plastic or the like. These horses, as a result, are many times plagued with various problems of lameness. Many of these problems are directly or indirectly related to the rigidity and non-resilience of shoes without shock absorption characteristics.

Shoes (e.g., horseshoes) protect the hooves of equidae against injury and add traction for a smoother stride. Further, if shoes are made of a resilient, flexible material, they can also absorb shock and provide cushioning to equidae hooves. In the past, a number of different shoes have been developed, which provide a cushion for hooves of equidae. In many of these shoes, a cushion has been provided by merely placing leather, rubber or even plastic pads in a variety of embodiments between the hoof and the metal shoe.

However, the presence of a uniform resilient material between the hoof and the metal shoe may not have sufficient shock absorbing characteristics. Further, a shoe made only of a uniform resilient material, such as rubber, may cause the shoe or nails, used to attach the shoe, to vibrate loose such that the shoe may slide on the hoof or separate from the hoof completely. Thus, there exists a need for an equidae shoe having sufficient shock absorbing characteristics and fabricated from a resilient material in such a manner that nails or adhesive do not vibrate loose causing the shoe to loosen, slide or completely separate from the hoof.

Typically, conventional metal shoes may not provide good traction for the equidae, can devastate vegetation when it's walked upon by equidae in some situations, are typically not lightweight, and generally do not provide protection to the frog and other parts of the underside of equidae hooves. Therefore, an improved shoe, which is fabricated from a lightweight resilient material, is needed to provide good traction and shock absorbance, less damage to vegetation, and protection to the underside of the horse's hoof. These and other objectives are obtained by the present invention.

SUMMARY OF THE INVENTION

The invention is directed toward an integrated shoe fabricated from elastomeric material having ply therein for attachment to a hoof of an equidae. The shoe of the invention is a single unit that does not require attachments, such as toe-irons, metal inserts, metal shoes or other complementary devices. Animals of the equidae family include: mammals classified in the groups of horses, asses, zebras and/or derivations thereof. A shoe of the present invention has: a peripheral configuration corresponding to the peripheral configuration of the sole of an equidae hoof and a cross section of substantially uniform thickness; a hoof engaging surface and an oppositely disposed resilient tread; and a nail-holding ply therein. The term "sole" as used herein refers to the entire underside of the hoof of an equidae, such as a horse. This term includes the bottom edge of the wall that encloses the white line and frog on the underside of the hoof. The shoe, preferably, has ply, which contains fibers selected from the group consisting essentially of rayon, polyester, nylon, and mixtures thereof. Alternatively, the shoe can have a ply that contains metal fibers.

Preferably, the shoe is cut from the footprint portion of a pneumatic tire and has: a peripheral configuration corresponding to the peripheral configuration of the sole of an equidae hoof and a cross section of substantially uniform thickness; and a hoof engaging surface and an oppositely disposed resilient tread. The footprint portion of a tire includes the outside circumference of the tire, including the tread and tread pattern, which generally remains in contact with the road surface while a vehicle is in motion.

Preferably, the tread has a pattern of generally parallel, spaced grooves. The shoe of the invention has a toe portion and right and left quarter portions extending rearwardly therefrom, and grooves in the tread pattern, which preferably extend, generally, in a direction perpendicular to the right and left quarter portions.

In a preferred embodiment, the shoe is a horseshoe having: a peripheral configuration corresponding to the peripheral configuration of the sole of a horse hoof and a cross section of substantially uniform thickness; a hoof engaging surface and an oppositely disposed resilient tread; and a nail-holding ply therein.

Preferably, a horseshoe of the claimed invention has a tread with a pattern. Preferably, the pattern includes generally parallel, spaced grooves. In addition, the horseshoe has a toe portion and right and left quarter portions extending rearwardly therefrom. In a preferred embodiment, the grooves in the tread pattern extend generally in a direction perpendicular to the right and left quarter portions.

In a preferred embodiment, the horseshoe is cut from a section which includes the footprint of a pneumatic tire, such as an automobile or truck tire. A horseshoe in accord with the present invention can be cut from a footprint of a bias ply, fabric radial, or steel belted radial automobile tire, for example.

A shoe in accord with the present invention can be any known shape for a horseshoe. For example, the shoe can be an egg bar horseshoe shape, a full bar horseshoe shape, or a heart bar horseshoe shape.

A shoe of the present invention is durable, lightweight, resilient, and shock absorbent in order to facilitate prevention of various problems of lameness in equidae, such as horses. In addition, use of a resilient elastomeric material in accord with the present invention provides traction to the equidae for smoother and safer travel on surfaces such as those having tar, gravel, snow, ice and/or grass. Further, the elastomeric material and resilience of the shoes of the present invention allow equidae to walk on grass without significantly damaging the sod.

One embodiment of a shoe of the present invention has particular advantages in snowy conditions over others in the art because balling is minimized. The term "bailing" refers to a phenomenon in which snow gets trapped in the ball or sole of an equidae hoof; melts due to the warmth of the sole of the hoof; and refreezes forming ice crystals and sometimes forming large balls underneath the equidae hoof. These ice crystals and balls can impede the mobility of the equidae. A shoe covering substantially the entire sole of the hoof, such as the shoe illustrated in FIG. 4, prevents this type of balling phenomenon.

A shoe of the present invention can be attached to a hoof using any means known in the art. Typically, with use of the present invention, attachment means, such as nails or an adhesive, are useable without the nails or adhesive loosening or pulling out of the hoof or through the shoe. Further, when the present invention is utilized, nails can be placed at any place in the sole of the shoe. Specific nail holes do not have to be drilled as is required for metal shoes. There is also the potential, with an elastomeric shoe of the present invention, for the shoe to be fitted subsequent to attachment to the hoof for a better, more accurate fit. In addition, a shoe of the present invention can be fitted with conventional studs, such as tungsten carbide studs, in order to facilitate higher degrees of traction when there are particularly adverse ground conditions.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT

Figure 1:
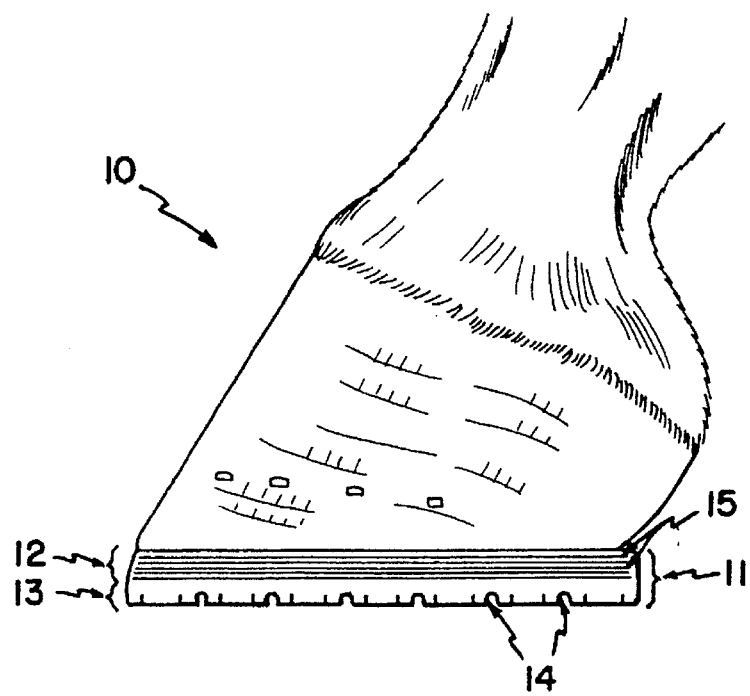
FIG. 1 shows a side view of a full bar horseshoe, cut from a footprint of an automobile tire having no metal therein, attached to a horse hoof, in accord with the present invention.
Figure 3:
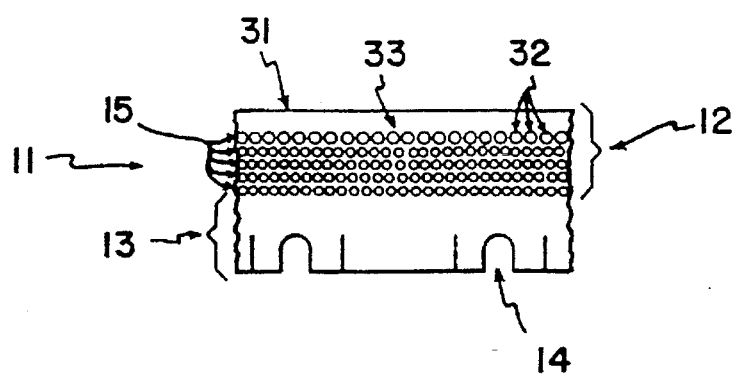
FIG. 3 shows an enlarged, fragmentary cross section of the horseshoe taken along line 3—3 of FIG. 2.

Referring now to the drawings, wherein like reference numerals designate corresponding structure throughout the views, and referring in particular to FIG. 1, there is shown a side view of a horse hoof 10 fitted with a horseshoe 11 which is fabricated from an elastomeric material in accord with the present invention. The horseshoe 11 is fabricated from an automobile tire having ply 12 and a resilient tread 13. FIG. 3 illustrates that the horseshoe has a hoof engaging surface 31 that is oppositely disposed from tread 13.

The ply 12 in FIG. 1, has multiple layers 15. Each layer includes non-metallic fibers 32, as illustrated in FIG. 3, that are embedded in an elastomeric material 33, such as natural rubber, synthetic rubber, or mixtures thereof as typically used in an automobile tire. The ply 12 can include synthetic, semisynthetic, or natural fibers 32. These types of fibers include rayon, polyester, nylon, cotton, and fiberglass.

In an alternate embodiment, ply can include metal fibers that are embedded in an elastomeric material, such as synthetic rubber, natural rubber, or mixtures thereof as typically used in a truck tire. Frequently, steel fibers are used in the ply of many types of truck tires.

Figure 2:
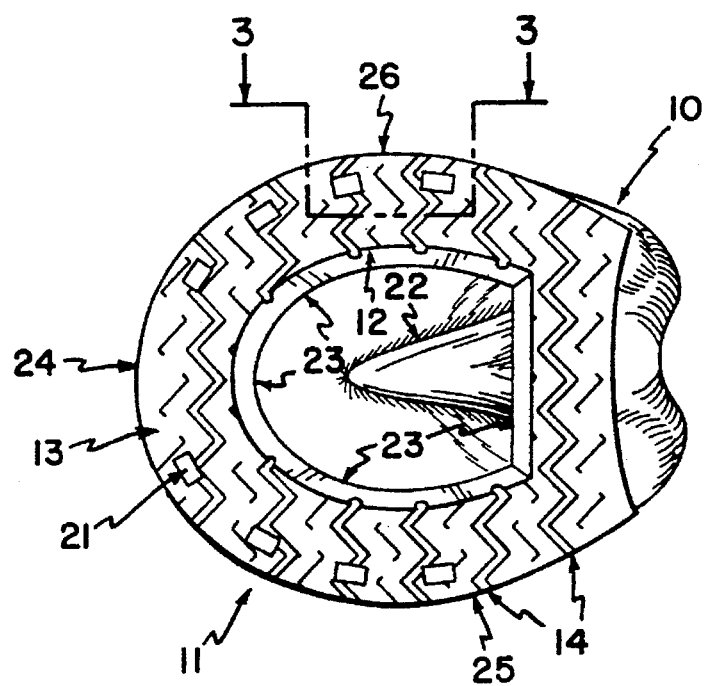
FIG. 2 shows a bottom view of the horse hoof and full bar horseshoe shown in FIG. 1.

Preferably, the ply 12 has a thickness such that it can prevent nails 21 in FIG. 2, which may be used to attach the horseshoe to a hoof, from loosening or punching out through the sole of the shoe. In a typical ply manufacturing operation, fibers 32 and an elastomeric material 33, such as rubber (i.e. natural rubber, synthetic rubber, and/or mixtures thereof), are extruded simultaneously to form ply 12, which is then cured to form a resilient yet tough material that is capable of holding nails 21, which are used to attach shoes to equidae, such as horses. In a preferred embodiment of the invention, the ply 12 and tread 13 are built into a pneumatic tire, such as an automobile tire, cured simultaneously to form a cured tire; and a horseshoe of the present invention is cut from a footprint portion of the tire.

Figure 4:
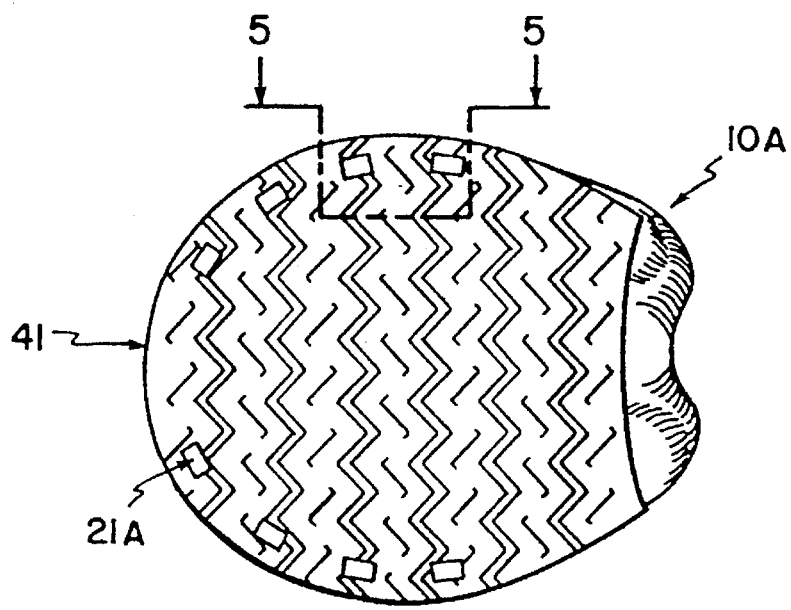
FIG. 4 shows a bottom view of a horseshoe, cut from a footprint of a belted radial automobile tire, attached to a horse hoof, in accord with the present invention.
Figure 5:
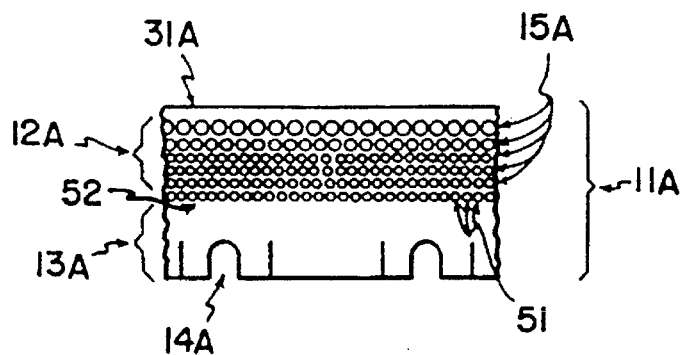
FIG. 5 shows an enlarged, fragmentary cross section of the horseshoe taken along line 5—5 of FIG. 4.

If the shoe is cut from the footprint of a tire, as illustrated in FIGS. 2, 4 and 6–8, there, typically, are tire components, other than ply, (e.g. belt package, some of the fibers 51 of which are illustrated in FIG. 5) in a tire that may contain fibers. These fibers found in other tire components may be synthetic, semisynthetic, natural and/or metal.

The tread 13 provides traction and additional shock absorbance to the horseshoe. A tread in accord with the present invention may or may not have a tread pattern. In a preferred embodiment, the tread 13 has a pattern which includes generally parallel, spaced grooves 14. The tread, has a toe portion 24 and right and left quarter portions 26 and 25, respectively. The parallel, spaced grooves 14, preferably, extend generally in a direction perpendicular to quarter portions 26 and 25.

In general, the shoes of the present invention have a cross section of substantially uniform thickness and a peripheral configuration corresponding to the peripheral configuration of the sole of an equidae hoof, such as a horse hoof. The shoes of the present invention can be a variety of shapes. In a preferred embodiment, as illustrated in FIG. 2, the horseshoe is a full bar shaped shoe.

Alternatively, the shoe can completely cover the underside of the hoof as illustrated by shoe 41 in FIG. 4. With the underside of the hoof covered by a shoe 41, the frog 22, located on the underside of the horse hoof 10, can be better protected and stimulated.

When the frog 22 is stimulated and not irritated by a horseshoe, the horse's circulation throughout the leg is stimulated, which gives the horse better stability and endurance while walking and running. The present invention stimulates the frog 22 without irritating it, because the elastomeric material, such as rubber, is resilient when it comes in contact with the frog 22. Thus, the frog 22 is not rubbed and irritated when it comes in contact with the shoe of the present invention. It is generally touched and stimulated.

Figure 6:
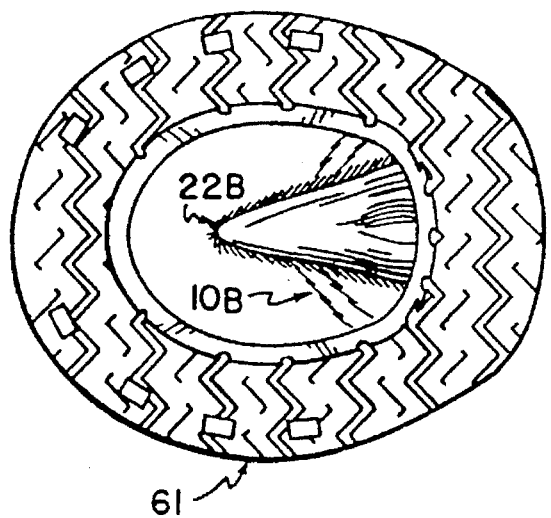
FIG. 6 shows a bottom view of an egg bar horseshoe, cut from a footprint of a pneumatic tire, attached to a horse hoof, in accord with the present invention.
Figure 7:
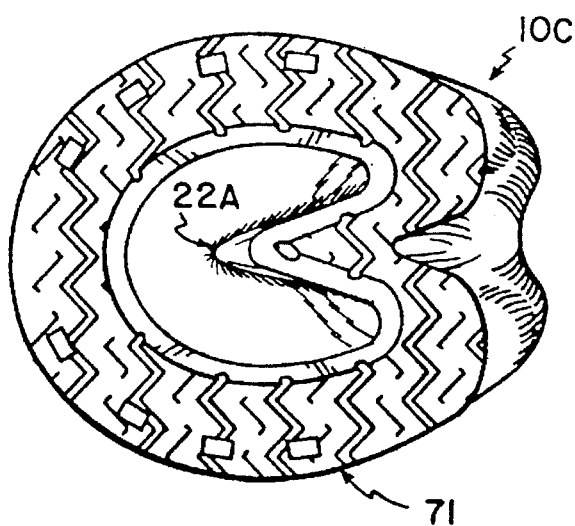
FIG. 7 shows a bottom view of a heart shaped horseshoe, cut from a footprint of a pneumatic tire, attached to a horse hoof, in accord with the present invention.
Figure 8:
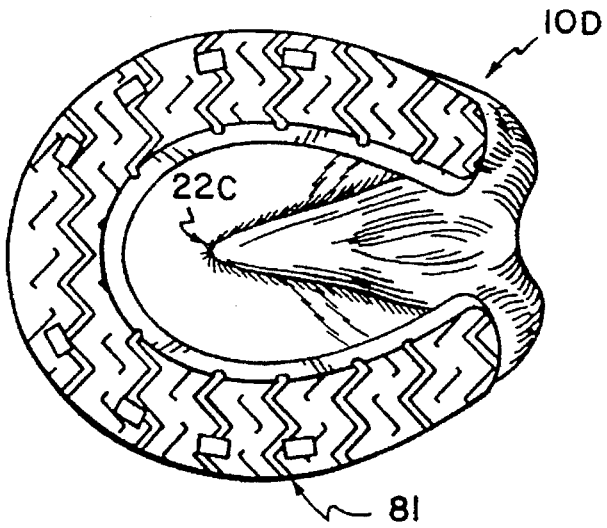
FIG. 8 shows a bottom view of a conventional open-back horseshoe, cut from a footprint of a pneumatic tire, attached to a horse hoof, in accord with the present invention.

In addition to the full soled shoe 41, other alternative embodiments for the shape of the shoe can be any shoe sufficient for attachment to the hoof of an equidae, such as an open back shoe 81, an egg bar shoe 61, or a heart shaped bar shoe 71, as illustrated in FIGS. 8, 6, and 7, respectively. FIG. 7 illustrates a heart shaped bar shoe 71, which generally protects a horse's frog 22A.

Referring now to preferred embodiments illustrated in FIGS. 3 and 5, which are enlarged, fragmentary cross sections of the shoes illustrated in FIGS. 2 and 4, respectively, the ply 12 and 12A includes five ply layers 15 and 15A. These five layers form a sufficient nail holding ply 12 and 12A such that nails 21 and 21A may be used as a means to attach a shoe to a hoof without having the nails 21 and 21A loosening from the shoe or the hoof and causing the shoe 11 and 11A to vibrate while attached to the horse hoof 10 and 10A.

A horseshoe in accord with the present invention may also contain a belt package containing fibers 51 embedded in an elastomeric material 52, such as natural rubber, synthetic rubber, or mixtures thereof. The belt package is typically built into a tire between the tread 13A and the ply 12A. The fibers 51 contained in a belt package can be metal, synthetic, semisynthetic, or natural. Typically, a belt package contains steel fibers (i.e. to form a steel belt package) or fabric fibers (i.e. to form a fabric belt package). In general, a horseshoe in accord with the present invention may contain any components that can be found in a pneumatic tire, such as toeguard, apex, innerliner, or sidewall.

Preferably, if a shoe shaped as shoe 11, 61, 71, or 81 is used, the sides 23 of the hole are beveled such that dirt and other small articles do not easily get trapped between the shoe and the underside of the hoof 10, 10B, 10C, 10D, and around the frog 22, 22A, 22B, 22C.

It is to be understood that although numerous characteristics and advantages of the present invention have been set forth in the foregoing description, together with details of structure and function of the invention, the disclosure is illustrative only. Changes may be made in detail, especially in matters of shape, size and attachment means within the principles of the invention to the full extent indicated by the broad general meaning of the terms in which the following claims are expressed.

What is claimed is:

1. A lightweight horseshoe of elastomeric material for nailing to a hoof of a horse comprising:
   (a) a peripheral configuration corresponding to the peripheral configuration of the sole of a horse hoof and a cross-section of substantially uniform thickness;
   (b) a hoof engaging surface and an oppositely disposed resilient tread; and
   (c) a nail holding ply therein; wherein said horseshoe is a single unit cut from a tire.

2. A horseshoe according to claim 1 wherein the ply contains fibers selected from the group consisting essentially of rayon, polyester, nylon, and mixtures thereof.

3. A horseshoe according to claim 1 wherein the ply contains metal fibers.

4. A horseshoe according to claim 1 wherein the tread has a pattern, said pattern comprising generally parallel, spaced grooves.

5. A horseshoe according to claim 4 wherein the horseshoe has a toe portion and right and left quarter portions extending rearwardly therefrom, and wherein said grooves extend generally in a direction perpendicular to said portions.

6. A horseshoe according to claim 1 wherein the horseshoe comprises a section cut from the footprint of a pneumatic tire.

7. A horseshoe according to claim 6 wherein the horseshoe comprises a section cut from the footprint of an automobile tire.

8. The horseshoe according to claim 7 wherein the tire is a belted radial tire.

9. A horseshoe according to claim 1 wherein the horseshoe is an egg bar shaped shoe.

10. A horseshoe according to claim 1 wherein the horseshoe is a full bar shaped shoe.

11. A horseshoe according to claim 1 wherein the horseshoe is a heart bar shaped shoe.

12. A horseshoe cut from the footprint portion of a pneumatic tire comprising:
    (a) a peripheral configuration corresponding to the peripheral configuration of the sole of a horse hoof and a cross section of substantially uniform thickness;
    (b) a hoof engaging surface and an oppositely disposed resilient tread; wherein said tread has a pattern, said pattern comprising generally parallel, spaced grooves; and wherein the horseshoe has a toe portion and right and left quarter portions extending rearwardly therefrom, and wherein said grooves extend generally in a direction perpendicular to said portions; and p1 (c) a nail-holding ply; wherein said horseshoe is a single unit cut from the tire.

13. A horseshoe according to claim 12 wherein the tire is an automobile tire.

14. A horseshoe according to claim 13 wherein the tire is a belted radial tire.

15. A horseshoe according to claim 12 wherein said ply contains metal fibers.

16. A horseshoe according to claim 12 wherein the horseshoe is a full bar shaped horseshoe.

17. A horseshoe according to claim 12 wherein the horseshoe is a heart bar shaped horseshoe.

18. A lightweight shoe of cured elastomeric material cut from the footprint of a tire for nailing to a hoof of an equidae comprising:
    (a) peripheral configuration corresponding to the peripheral configuration of the sole of the equidae hoof;
    (b) a hoof engaging surface and an oppositely disposed resilient tread; and
    (c) a nail holding ply cured therein; wherein said shoe is a single unit cut from a tire.

19. A horseshoe cut from the footprint portion of a cured pneumatic tire and attached to a horse's hoof, comprising:
    (a) a peripheral configuration corresponding to the peripheral configuration of the sole of the hoof and a cross section of substantially uniform thickness;
    (b) a hoof engaging surface and an oppositely disposed resilient tread; wherein said tread has a pattern, said pattern comprising generally parallel, spaced grooves; and wherein the shoe has a toe portion and right and left quarter portions extending rearwardly therefrom, and wherein said grooves extend generally in a direction perpendicular to said portions;
    (c) nails therein extending through said hoof engaging surface attaching said shoe to the hoof; and
    (d) a plurality of ply layers cured therein and forming a ply having sufficient thickness and strength to hold said nails.

20. A lightweight shoe of cured elastomeric material cut from the footprint of a tire attached to a hoof of an equidae comprising:

(a) a peripheral configuration corresponding to the peripheral configuration of the sole of the equidae hoof;
(b) a surface engaging the hoof and an oppositely disposed resilient tread;
(c) a nail holding ply cured therein; wherein said shoe is a single unit cut from a tire and wherein said shoe is attached to said hoof by a plurality of nails extending through said shoe into said hoof; and wherein said nails are held from loosening from said shoe by said nail holding ply.

\* \* \* \* \*

UNITED STATES PATENT AND TRADEMARK OFFICE
CERTIFICATE OF CORRECTION

PATENT NO. : 5,533,575

DATED : July 9, 1996

INVENTOR(S) : David W. Brown

It is certified that error appears in the above-identified patent and that said Letters Patent is hereby corrected as shown below:

Column 2, Line 57, "bailing" should read --balling--.

Column 6, Lines 23-24, delete "p1(c) a" after the word "and".

Column 6, Line 25, before "nail-holding", insert --(c) a--.

Signed and Sealed this

Twelfth Day of November, 1996

Attest:

BRUCE LEHMAN

Attesting Officer       Commissioner of Patents and Trademarks